United States Patent [19]
Farwell et al.

[11] Patent Number: 5,491,741
[45] Date of Patent: Feb. 13, 1996

[54] PRIORITIZING A MULTIPLE ACCESS CHANNEL IN A WIRELESS TELEPHONE SYSTEM

[75] Inventors: Charles Y. Farwell, Denver; Richard D. Miller, Northglenn; Richard A. Windhausen, Westminster, all of Colo.

[73] Assignee: AT&T Corp., Murray Hill, N.J.

[21] Appl. No.: 965,504

[22] Filed: Oct. 23, 1992

[51] Int. Cl.[6] ................................................. H04Q 7/22
[52] U.S. Cl. .................... 379/59; 370/85.2; 370/95.1; 370/95.3; 379/60; 379/63; 455/33.2; 455/34.1; 455/54.2; 455/56.1; 455/63
[58] Field of Search ................................. 379/58, 59, 60, 379/63; 370/85.2, 85.3, 95.1, 95.2, 95.3, 94.1; 455/33.2, 33.1, 34.1, 54.1, 54.2, 56.1, 63, 58.1

[56] References Cited

U.S. PATENT DOCUMENTS

| | | | |
|---|---|---|---|
| 4,464,658 | 8/1984 | Thelen | 370/16 |
| 4,536,875 | 8/1985 | Kume et al. | 370/85.3 |
| 4,771,448 | 9/1988 | Koohgoli et al. | 379/60 |
| 4,921,464 | 5/1990 | Ito et al. | 455/34.1 |
| 4,926,421 | 5/1990 | Kawano et al. | 370/85.1 |
| 5,042,082 | 8/1991 | Dahlin | 379/60 |
| 5,067,171 | 11/1991 | Kawano | 379/60 |
| 5,068,654 | 11/1991 | Husher | 455/54.1 |
| 5,109,390 | 4/1992 | Gilhousen et al. | 375/1 |
| 5,189,734 | 2/1993 | Bailey et al. | 379/60 |

FOREIGN PATENT DOCUMENTS

| | | | |
|---|---|---|---|
| 0268375 | 5/1988 | European Pat. Off. | H04Q 7/04 |
| 2246053 | 8/1991 | United Kingdom | H04Q 7/04 |

OTHER PUBLICATIONS

Chia, S T S, *Location Registration and Paging in a Third Generation Mobile System*, BT Technology Journal, vol. 9, No. 4, Oct. 1991, UK, pp. 61–68.

*Primary Examiner*—John K. Peng
*Assistant Examiner*—Daniel J. Wu
*Attorney, Agent, or Firm*—John C. Moran

[57] ABSTRACT

Base stations responding on a shared channel to a registration request message received on another shared channel from a wireless mobile unit with the base station to which the mobile unit is assigned transmitting in a first time slot and the other base stations transmitting in a time slot determined by the strength of the received signal from the mobile unit. If two base stations respond to the registration request message in the same time slot and the assigned base station does not respond, the mobile unit determines whether there is a response in a time slot which is earlier in time to the first time slot than the collided time slot. If the collided time slot is earlier in time than any other time slot in which a response is received, the mobile unit transmits a second registration request message specifying the collided time slot. Each of the base stations that had responded in the collided time slot responds by sending a base reply message in a random time slot, and the other base stations do not respond to this second registration request message. The mobile unit selects one of the base reply messages in a random time slot.

28 Claims, 6 Drawing Sheets

FIG. 1

FIG. 2
BASE STATION 103

FIG. 3

FIG. 4
DEDICATED CHANNEL ASSIGNMENTS

| CHANNEL # | NAME | FUNCTION | USED BY |
|---|---|---|---|
| 1 | REGISTRATION REQUEST | AUTO-REGISTRATION | MOBILE |
| 2 | BASE REPLY | AUTO-REGISTRATION | BASE |
| 3 | HANDSET ACKNOWLEDGE | AUTO-REGISTRATION | MOBILE |
| 4 | OUTGOING CALL REQUEST | OUTGOING CALL SETUP | MOBILE |
| 5 | OUTGOING DOTTING | OUTGOING CALL SETUP | BASE |
| 6 | OUTGOING BIG SYNC | OUTGOING CALL SETUP | BOTH |
| 7 | INCOMING DOTTING | INCOMING CALL SETUP | BASE |
| 8 | INCOMING BIG SYNC | INCOMING CALL SETUP | BOTH |

FIG. 5

FIG. 6
REGISTRATION REQUEST FRAME

FIG. 7
BASE REPLY FRAME

FIG. 8
ACKNOWLEDGE FRAME

FIG. 9

PRIORITIZING A MULTIPLE ACCESS CHANNEL IN A WIRELESS TELEPHONE SYSTEM

TECHNICAL FIELD

This invention relates to cordless, cellular, and PCS telephone systems and more particularly to an arrangement for prioritizing access to a channel shared by a plurality of wireless stations.

BACKGROUND OF THE INVENTION

In a wireless communication system, each mobile terminal must be able to establish communications (commonly referred to as registration) with a stationary base station in a cell. To allow this, some communication method must be defined and be known by all terminals. Most cellular communication systems in use today employ frequency division multiple access (FDMA). One type of FDMA uses busy-tone multiple access (BTMA). The digital equivalent of a BTMA uses either a repetitive bit or a repetitive field in a transmitted bit stream instead of a busy tone for inhibiting access, thus permitting the busy-tone channel to carry other data. The U.S. domestic cellular telephone systems, in accordance with EIA standard IS-3-D, employ BTMA and frequency re-use. Each cell is assigned one of a plurality of forward control channels designated as paging channels, paired in radio frequency with reverse control channels designated as access channels, and reused in such a way as to minimize interference between cells. Both the mobile terminals (conventional cellular telephones) and the base stations operate full-duplex. Repetitive bits called D–I bits positioned in the forward control channel message stream provide the busy-idle indication. The mobile terminal, prior to seeking an access channel, preselects which of the plurality of access channels it is receiving the best. The mobile terminal then determines its D–I status; if busy, it enters a random time-out to re-try, but if not busy, the terminal starts sending a message on the corresponding reverse control channel. Sometimes the reverse control channel in a first cell receives a message from a remote mobile terminal, the FM receiver of which is undesirably captured by a second cell using the same frequency pair. When this happens, the forward control channel of the first cell will raise its busy indication, and may actually attempt to exchange messages with the mobile terminal; but, because the mobile terminal's receiver is captured by a second cell, the protocol and control means ultimately protects the cellular system. Still, this effect reduces the capacity of the signaling channels. U.S. Pat. No. 5,047,762 of E. J. Bruckert proposes a scheme to help control this problem. A second fixed station receiving the remote mobile terminal's transmission uses the station identification and the signal strength of the remote mobile terminal to determine whether transmissions from other remote terminals should be inhibited. Depending upon the geographical proximity of the first fixed station to the second fixed station and the remote mobile terminal signal strength at the second fixed station, a signal representative of the remote mobile terminals signal strength at the second fixed station may be transmitted by the second fixed station. This representative signal may be used by a second remote mobile terminal to determine whether the second remote mobile terminal may transmit.

The U. S. patent application of J. P. Cotsonas, et al., Ser. No. 07/704516, filed on May 23, 1991, and assigned to the same assignee as the present application, discloses resolving contention for a dedicated channel among base units responding to a registration request from a mobile unit by assigning a time also referred to as time slot at which the base unit will respond as a function of the random number generated by the base unit. In addition, that U.S. patent application also teaches resolving contention by the base units responding at particular times based on the received signal strength from a mobile unit requesting the service to the individual base stations. The base unit receiving the greater received signal strength will respond first.

While the foregoing arrangements assist in avoiding contention between base stations in responding to a registration request from a mobile unit, the generation of a random number in order to determine a time slot suffers from the problem that there are a finite number of time slots available which increases the probability that two or more base units will generate a random number designating the same time slot. Further, the method of determining the time slot on the basis of the received signal strength also suffers from the problem that there will be locations where more than one base station receives the same signal strength from a mobile unit; hence, these base stations will be trying to respond in the same time slot.

In addition, the foregoing ,arrangements do not solve the problem of assigning a mobile unit to particular base station and giving that base station priority over the other base stations in responding to a registration request. This problem is an important one in personal communication services (PCS) systems where it is desirable for traffic control to assign mobile units to particular base stations and to utilize one of those base stations to service an assigned mobile unit if possible.

SUMMARY OF THE INVENTION

This invention is directed to solving these and other problems and disadvantages of the prior art. According to the invention, to register, a mobile unit transmits a registration request message on a shared channel which all base stations continuously monitor. All available base stations receiving the message respond on another shared channel with the base station to which the mobile unit is assigned transmitting in a first time slot and the other base stations transmitting in a time slot determined by the strength of the received signal from the mobile unit. This allows the assigned base station to respond first and avoids any collisions between the assigned base station and other base stations.

If the assigned base station responds, the mobile unit sends an acknowledge message to the assigned base station which then registers the mobile unit. However, if the assigned base station does not respond to the registration request message, the mobile unit selects the base station which responded in a time slot earlier than the response of the other base stations. The mobile unit then sends an acknowledge message to the selected base station, and the selected base station then registers the mobile unit. If two base stations respond to the registration request message in the same time slot, the mobile unit determines whether there is a response in a time slot which is closer to the first time slot than the collided time slot. If there is a time slot earlier in time than the collided time slot, the mobile unit sends an acknowledge message to the base station transmitting in this earlier time slot. However, if the collided time slot is earlier in time then any other time slot in which a response is received, the mobile unit transmits a second registration request message specifying the collided time slot. Each of the base stations that had responded in the collided time slot responds by sending a base reply message in a random time slot, and the other base stations do not respond to this second registration request message. The mobile unit selects one of the base reply messages in a random time slot. The mobile unit transmits an acknowledge message which includes the random time slot number. The selected base station is responsive to that acknowledge message to register the mobile unit.

DETAILED DESCRIPTION

Figure 1:
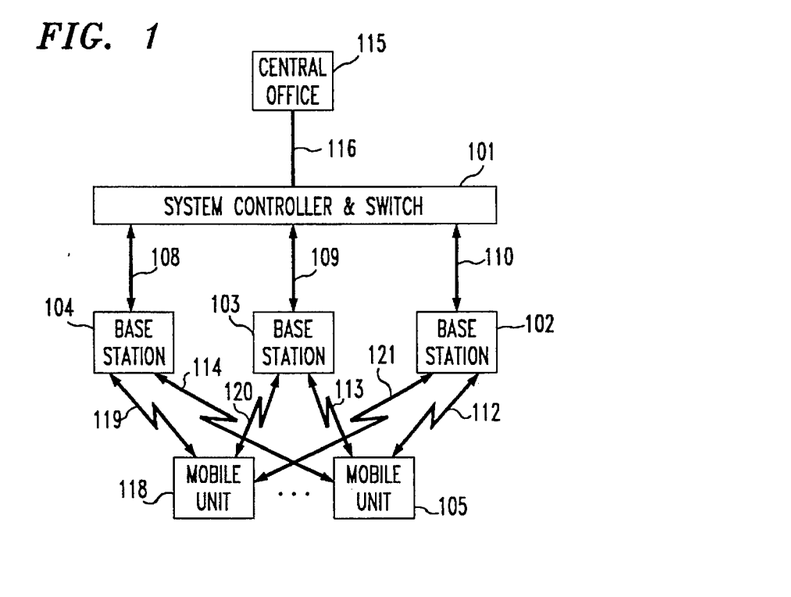
FIG. 1 is a block diagram of a personal communications service system that incorporates an illustrative embodiment of the invention.

FIG. 1 illustrates a wireless communication system designed to provide PCS type service for a plurality of mobile units such as mobile units 105 and 118. Base stations 102–104 are each, capable of maintaining radio links such as RF links 113 and 120 with mobile units such as mobile units 105 and 118 respectively, and each base station is interconnected to the system controller and switch 101 via a digital link such as link 109. Advantageously, these links may be primary rate interface (PRI) links as defined for ISDN communication. System controller and switch 101 provides the control and switching facility for interconnecting base stations with each other via links 108–110 or interconnecting a base station with central office 115 via link 116 and the corresponding digital link for the base station. A link such as link 108 can advantageously handle up to 23 different calls. Link 116 may be a plurality of PRI links.

Central office 115 is a central office such as the AT&T 5ESS. Central office 115 is also interconnected to the public telephone system. System controller and switch 101 may advantageously be the switching system disclosed in B. M. Bales, et al. "A Switching System Using Identical Switching Nodes", Ser. No. 07/636521, filed on Dec. 31, 1990, and assigned to the same assignee as the present application. This application of B. M. Bales, et al. is hereby incorporated by reference.

Wireless communication between a base station and a mobile unit, such as base station 103 and mobile unit 105, is via a wireless communication link such as RF link 113. This wireless communication is implemented utilizing spread spectrum technology with frequency hopping. The specific requirements for the frequency hopping are set forth in a Report and Order in General Docket Number 89-354, this Report and Order being adopted by the Federal Communications Commission on Jun. 14, 1990 and released on Jul. 9, 1990. In one implementation of the invention, one hundred seventy three possible channels are created in the 902–928 MHz frequency band and each active telephone call transmits and receives audio information in a random set of 50 of these channels. Transmission only occurs for 5 milliseconds in each channel. This type of transmission is disclosed in greater detail in M. E. Gillis, et al. "A Cordless Telephone Arranged for Operation in a Frequency Hopping System", filed Oct. 21, 1991, Ser. No. 07/779754 and assigned to the same assignee as the present application. The U. S. patent application of Gillis, et al. is hereby incorporated by reference. Audio information received by base station 103 from mobile unit 105 via RF link 113 is then transmitted to system controller and switch 101 via link 109.

Figure 4:
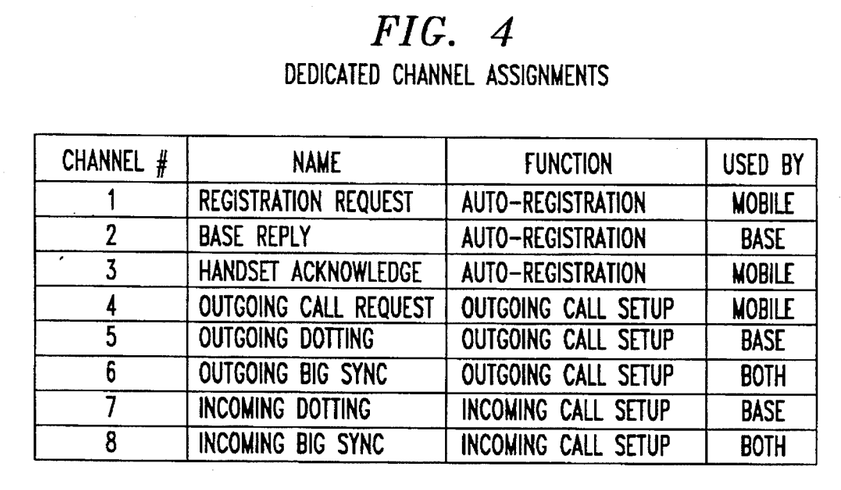
FIG. 4 is a table defining the dedicated channels shared by all base stations.
Figure 6:
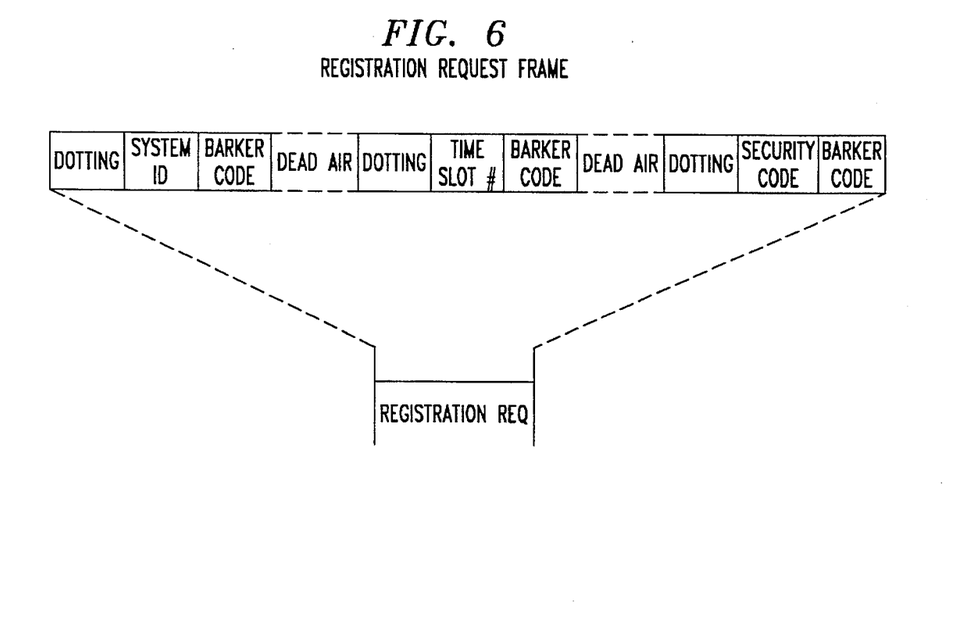
FIG. 6 illustrates a registration request frame.

Consider now a first example of how mobile unit 105 initially registers itself with a base station and consequently system controller and switch 101. As previously mentioned, there are 173 channels available. Of the available channels, eight channels are dedicated for specific purposes as illustrated in FIG. 4, which gives a table of dedicated channel assignments. All eight of the dedicated channels are commonly shared by the base stations and the mobile units. The remaining 165 channels are utilized for carrying audio information with a set of 50 channels being utilized for each telephone call. Consider mobile unit registration with respect to mobile unit 105 which is assigned to base station 103. Mobile unit 105 transmits a registration request message, containing its handset ID (also referred to as a security code) on the dedicated registration request channel (channel 1). In addition, the registration request contains the system ID and time slot number fields. This request is illustrated in FIG. 6. Mobile unit 105 then tunes to the dedicated based reply channel (channel 2) to await a response from the base stations. The dotting sequence (also referred to as the synchronization pattern) illustrated in the registration request frame of FIG. 6 allows idle radio units in the base stations to come into synchronization with the frame transmission of the registration request message. The idle radio units of the base stations monitor the registration request channel looking for a dotting sequence from any mobile unit. If a base station is receiving a sufficiently strong signal, it is assumed that the base station will be able to acquire synchronization within one dotting frame. If the base station is not receiving a sufficiently strong signal, the base station does not acquire synchronization, and the base station is not a good candidate for registration.

Figure 7:
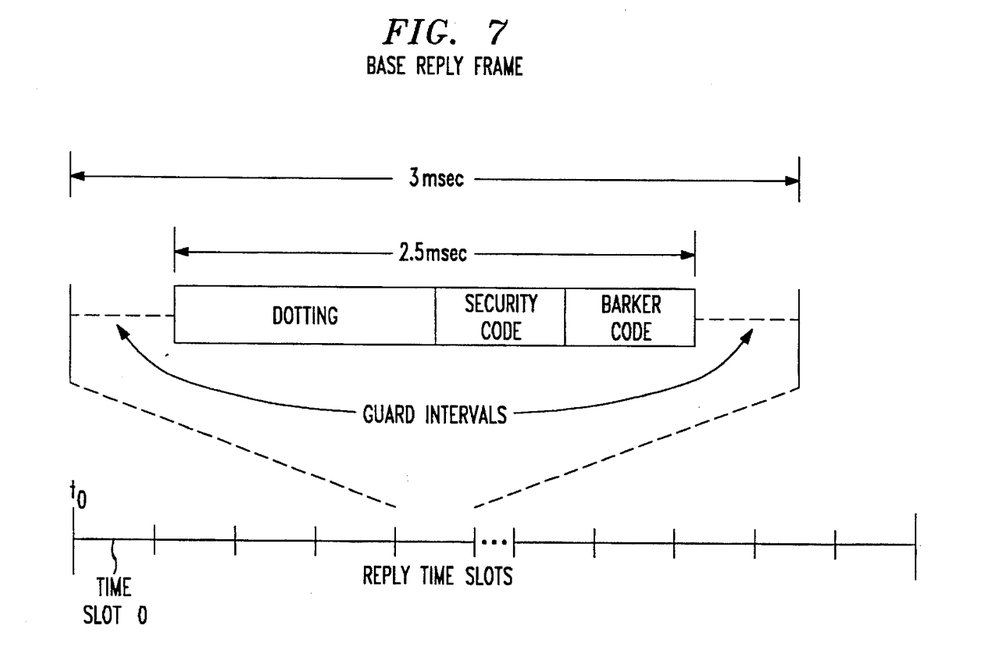
FIG. 7 illustrates a base reply frame.

Assume for this example, that the base stations receive descending levels of signal strength in the following order: base station 104, base station 103, base station 102. The radio units in each base station are capable of deciphering levels of signal strength. Since it is assumed that base station 103 (the assigned base station for mobile unit 105) has an idle receiver, base station 103 responds to the registration request message by transmitting the base reply message in the base reply frame illustrated in FIG. 7. The base reply frame is transmitted in the base reply channel in time slot 0. Since base stations 102 and 104 are not assigned base stations for mobile unit 105, those base stations each start a response timer whose time interval is determined by signal strength of the registration request. This time interval identifies a time slot in the dedicated base reply channel during which the base station responds to the mobile unit. The number of time slots available in the base reply channel is determined by the granularity of the signal strength detector plus one dedicated time slot for the assigned base station. The stronger the signal is, the shorter the time interval. When the timer expires, the base station sends a base reply message on the base reply channel containing the mobile unit's ID.

Figure 8:
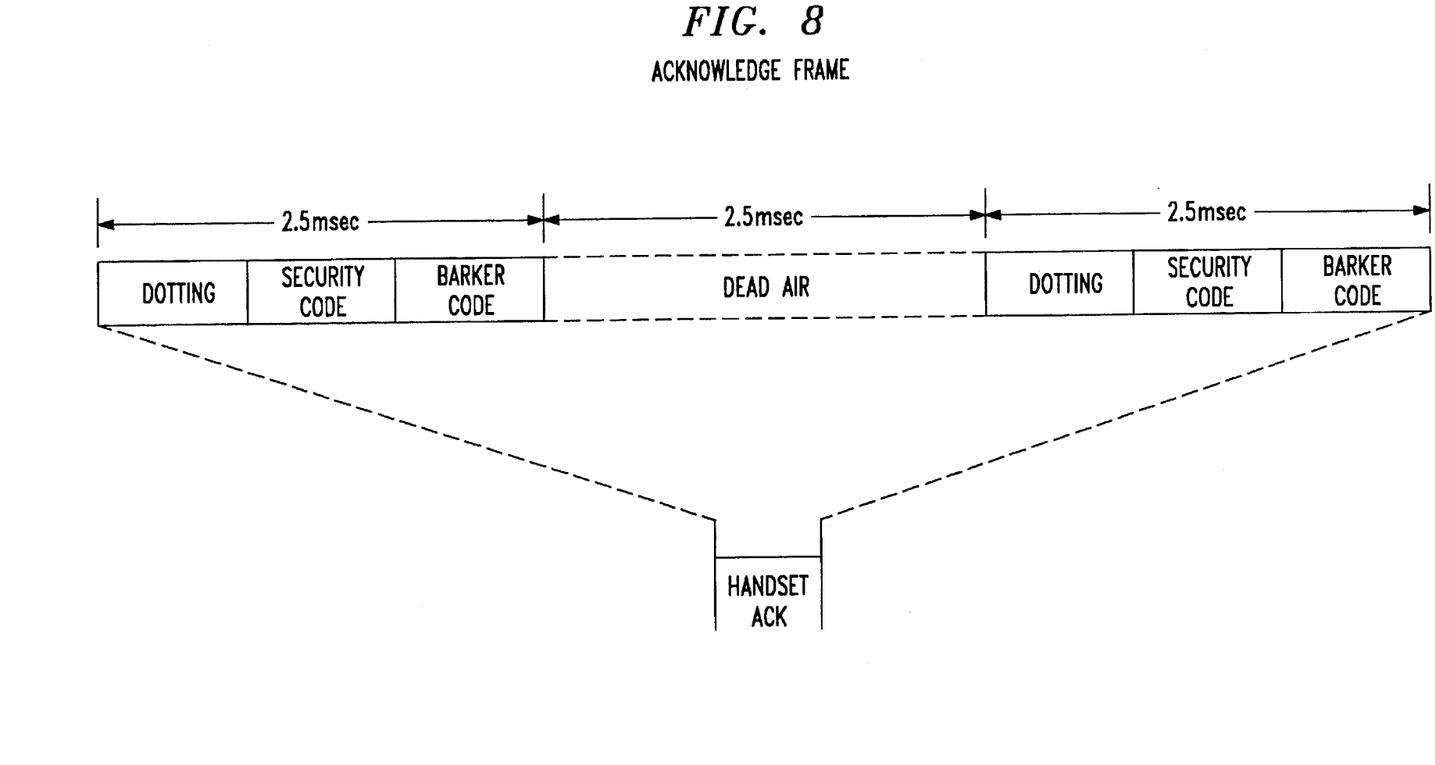
FIG. 8 illustrates an acknowledge frame.

In the present example, base station 103 responds first, followed by base station 104, and then base station 102. Mobile unit 105 is responsive to the base reply frame to select the base station in the earliest time slot. In the present example, mobile unit 105 selects base station 103. In the base reply frame, base station 103 does not include its own identification; rather, base station 103 stores the time slot in which it transmitted the base reply. This is done to save transmission capacity and also to assure that mobile unit received the base reply. When mobile unit 105 receives the base reply frame, it responds by transmitting an acknowledgement on the dedicated handset acknowledged channel (channel 3). In addition to the mobile unit ID, the acknowledgement message also carries the time slot number which designates that base station 103 has been selected for registration. As illustrated in FIG. 8, the handset acknowledgement frame is a total of 7.5 milliseconds.

After base station 103 receives the acknowledgement message, it transmits to system controller and switch 101 the ID of mobile unit 105. During transmission on the registration request, base reply, and handset acknowledge channels, collisions can occur where other mobile units or base stations are also attempting to transmit on these channels at the same time as base station 103 and mobile unit 105. The problems arising from these collisions are solved as set forth with respect to the explanation of FIG. 5 which details the actions taken by a base station during the registration process and FIG. 9 which details the action taken by a mobile unit during the registration process. Once registration is accomplished, the system controller and switch 101 has the information required to route an incoming call for mobile unit 105 to base station 103 in the present example. Since a mobile unit may be moving, each mobile unit implements the registration procedure every 30 seconds.

If base station 103 had no idle radio unit or had received the registration request message from mobile unit 105 at too low a signal level, then base station 103 would not have responded in the first time slot. In that situation, base station 104 would respond before base station 102, and mobile unit 105 would respond to base station 104 in the same manner as previously described for base station 103. Mobile unit 105 would have become registered with base station 104.

Consider now a second example of how mobile unit 105 initially registers itself with a base station. In this example, it is assumed that mobile unit 105 is assigned to base station 103, but base station 103 does not respond to the registration request message. However, both base stations 102 and 104 respond with base reply messages in time slot 1. Mobile unit 105 is responsive to the base reply messages to determine that a collision has occurred in time slot 1 (also referred to as a collided time slot). As illustrated in FIG. 6, the registration request includes a time slot number field. When mobile unit 105 sent out the initial registration request message, it designated time slot 0 in the time slot field. A "0" in the time slot field indicates that this is the first registration request message. In response to detecting a collision in time slot 1, mobile unit 105 sends out a second registration request message with a "1" in the time slot field. This informs the base stations that a collision has occurred in time slot 1. Both base stations 102 and 104 are responsive to the second registration request message to each transmit a base reply message in a random time slot as selected by a random number generator in each base stations 102 and 104. Mobile unit 105 then selects either base station 102 or 104 on the basis of earliest random time slot and transmits the acknowledge message to that base station. The selected base station then registers mobile unit 105. If the second registration request message results in a collided time slot, then mobile unit 105 sends another registration request designating the time slot on which the collision first occurred which in this example is time slot 1.

Figure 2:
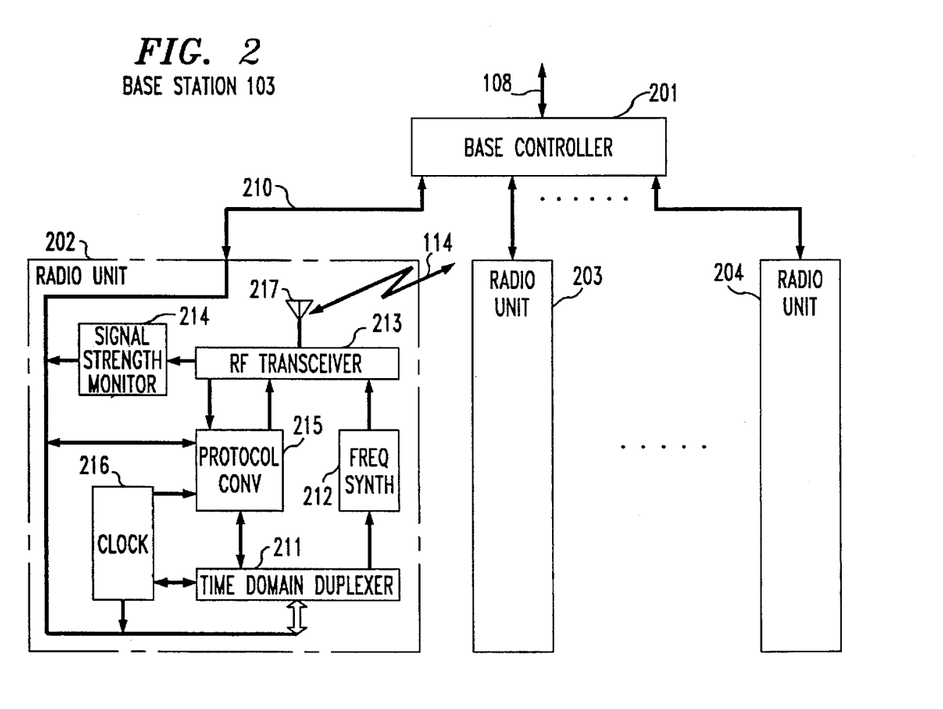
FIG. 2 is a block diagram of a base station.

FIG. 2 illustrates, in greater detail, base station 103. Base controller 201 controls the operations of radio units 202–204. Radio unit 202 is shown in detail, and radio units 203–204 are similar in design. Radio unit 202 includes clock 216 for providing synchronization to Time Domain Demultiplexer (TDD) 211 and protocol converter 215. Radio unit 202 also includes radio frequency (RF) transceiver 213, antenna 217 and frequency synthesizer 212. Transceiver 213 comprises both a RF transmitter and a RF receiver. Transceiver 213 demodulates voice signals and control signals transmitted by a mobile unit and couples the voice signals via protocol converter 215 to base controller 201 via link 210. Base controller 201 provides all control for radio unit 202 via bus 210. Control signals received from transceiver 213 are transferred through protocol converter 215 to base controller 201 via bus 210. Protocol converter 215 is also responsive to digitally encoded voice signals received via bus 210 from base controller 201 to convert those digital voice signals into the format utilized for transmission to a mobile unit. Signal strength monitor 214 is responsive to a signal from RF transceiver 213 to arrive at a digital value representing the signal strength being received by RF transceiver 213 and to transmit this digital value to base controller 201 via bus 210.

Base controller 201 also controls the hopping sequence by generating a pseudo-random data list of frequencies using a seed in a pseudo-random generator as is well known in the art. The pseudo-randomly generated data list is transferred to TDD 211 via bus 210 by base controller 201. TDD 211 controls the frequency selected in the frequency hopping cycle by transmitting to frequency synthesizer 212 at appropriate times the values stored in the data list generated by base controller 210. TDD 212 also refreshes the frequency synthesizer 212 as the synthesizer progresses through the frequency hopping cycle. In order to have RF transceiver 213 transmit and receive on one of the dedicated channels, base controller 201 transfers frequency data to TDD 211 which contains only one frequency, e.g. the frequency of the dedicated channel. TDD 211 then controls frequency synthesizer 212 so that transceiver 213 operates on this one frequency. Clock 216 is used to achieve synchronization with the dotting pattern previously described and to achieve Big Sync (Big Sync is described in a later section) based on input received from transceiver 213 and TDD 211.

Consider the first example which was given with respect to FIG. 1 in light of the detailed block diagram of radio unit 202 of FIG. 2. Further assume, for the sake of the example, that radio unit 202 was idle when mobile unit 105 started the registration procedure. Since radio unit 202 was idle, base controller 201 transmitted frequency data to TDD 211 which caused frequency synthesizer 212 to control RF transceiver 213 such that RF transceiver 213 monitored the registration request channel. When mobile unit 105 transmits the registration request, transceiver 213 receives this request and transmits a signal indicative of the signal strength to signal strength monitor 214. In addition, transceiver 213, via protocol converter 215 and bus 210, transmits the registration request including the security code which identifies mobile unit 105 to base controller 201. Base controller 201 is responsive to the registration request from radio unit 202 to request the signal strength from signal strength monitor 205 via bus 210. Base controller 201 is responsive to the signal strength from signal strength monitor 205 to ascertain whether or not the signal strength is strong enough so that base station 103 can handle calls from mobile unit 105. Assuming that the signal strength is strong enough, base controller 201 transmits frequency data to TDD 211 via bus 210 to tune transceiver 213 to the base reply channel. Then, base controller 201 transmits via bus 210 the base reply message to protocol converter 215, which causes transceiver 213 to transmit this message on the base reply channel during time slot 1.

Base controller 201 tunes transceiver 213 to the acknowledge channel by controlling TDD 211 and frequency synthesizer 212. Transceiver 213 is responsive to the acknowledge message transmitted by mobile unit 105 to transfer this message to base controller 201 via protocol converter 215 and bus 210. The acknowledge message contains the ID of mobile unit 105. Base controller 201 transmits the mobile unit ID to system controller and switch 101 as part of a registration message.

Clock 216, under control of base controller 201, performs the synchronization process with respect to the dotting information—on both the registration request and the acknowledge messages. Similarly, transceiver 213 is controlled by base controller 201 via protocol converter 215 and clock 216 to provide the dotting synchronization information during the transmission of the base reply on the base reply channel.

Base stations 102 and 104 have the same configuration as shown for base station 103 in FIG. 2. For the first example, consider how base station 104 responds to the registration request from mobile unit 105 assuming base station 103 had not responded to the registration request. The radio unit in base station 104 functions in the same manner as that previously described for radio unit 202 of base station 103. The base controller in base station 104 is responsive to the signal strength from its signal strength monitor to determine the time interval (which determines the time slot) after which it should transmit a base reply message on the base reply channel. The base controller inserts this time interval into an internal timer. When the internal timer times out, the base unit then controls the transmission of the base reply message to mobile unit 105 as was previously described for radio unit 202 of FIG. 2 with respect to base station 103. In addition, the base controller of base station 104 performs the same operations when the acknowledge message is received from mobile unit 105 as was previously described for base station 103 if base station 104 is selected for registration by mobile unit 105.

For the second example, base stations 102 and 104 operate in a manner similar to that described in the previous paragraph; however, the radio units in each of base stations 102 and 104 perform the transmission of the two base reply messages as was previously described when base stations 102 and 104 collide as a result of determining the same signal strength for the first base reply message.

Figure 3:
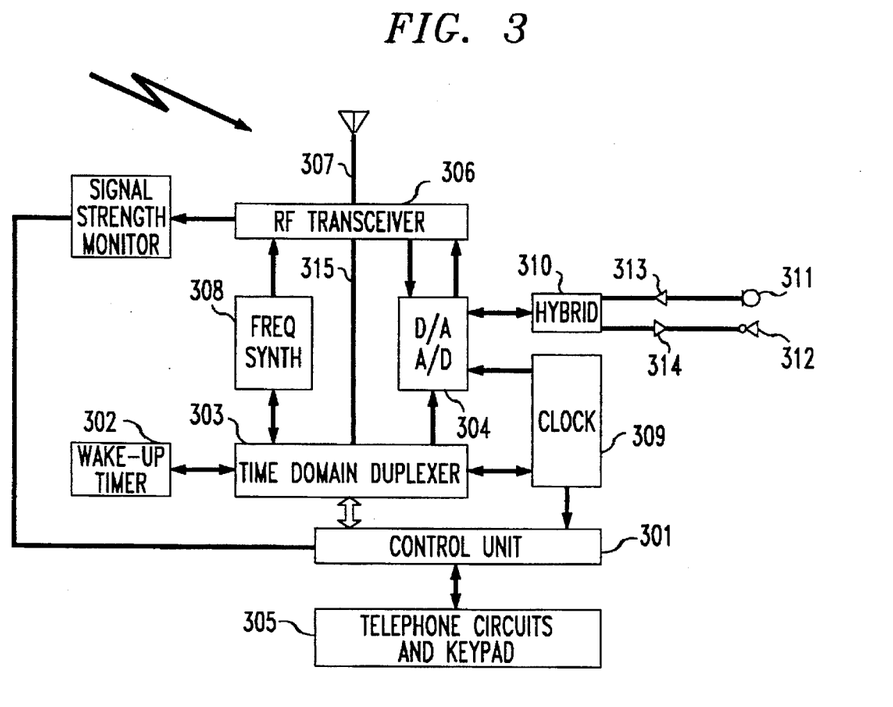
FIG. 3 is a block diagram of a mobile unit.

FIG. 3 illustrates mobile unit 105 in greater detail. Components in this unit include control unit 301, wake-up timer 302, and clock 309 for providing synchronization to: (1) control unit 301, (2) Time Domain Duplexer (TDD) 303, and (3) combined digital-to-analog and analog-to-digital (D/A+A/D) converter 304. Also included in mobile unit 105 are RF transceiver 306, antenna 307 and frequency synthesizer 308. Telephone circuits and keypad section 305 permits dialing telephone digits and actuating control keys for placing and receiving telephone calls.

Transceiver 306 comprises both an RF transmitter and an RF receiver. Transceiver 306 demodulates voice signals transmitted by a base station and couples these signals via the D/A section of converter 304 and hybrid 310 on to loudspeaker 312. Transceiver 306 receives its input analog speech signals from microphone 311. These analog speech signals are coupled to the transceiver via hybrid 310 and the A/D section of converter 304. Converter 304 converts the analog signals to a digital signals which are then transmitted to RF transceiver 306. Conventional amplifiers 313 and 314 are employed for amplifying the analog speech signals obtained from microphone 311 and provided to loudspeaker 312.

Consider now the first example of the registration procedure with respect to FIG. 1 in light of FIG. 3. The registration procedure can be initiated by telephone circuits and keypad 305 in response to the user requesting that the registration procedure be performed or in response to an input from wake-up timer 302. (Recall that the registration procedure is performed every 0.5 seconds.) Control unit 301 tunes transceiver 306 to transmit on the registration request channel by controlling TDD 303 and frequency synthesizer 308. Control unit 301 then transmits the registration request via transceiver 306 by transferring information to transceiver 306 via blocks 303 and 304. Control unit 301 then tunes transceiver 306 to the base reply channel by controlling TDD 303 and frequency synthesizer 308. When the base reply is received by transceiver 306, this message is transferred to control unit 301 via bus 315 and TDD 303. In response to the base reply message, control unit 301 tunes transceiver 306 to the acknowledge channel and transmits the acknowledge message to base controller 201 by transferring this message to transceiver 306 via bus 315 and TDD 303. Control unit 301 controls the processing of the dotting sequence of the previous messages by controlling clock 309 and TDD 303.

Figure 5:
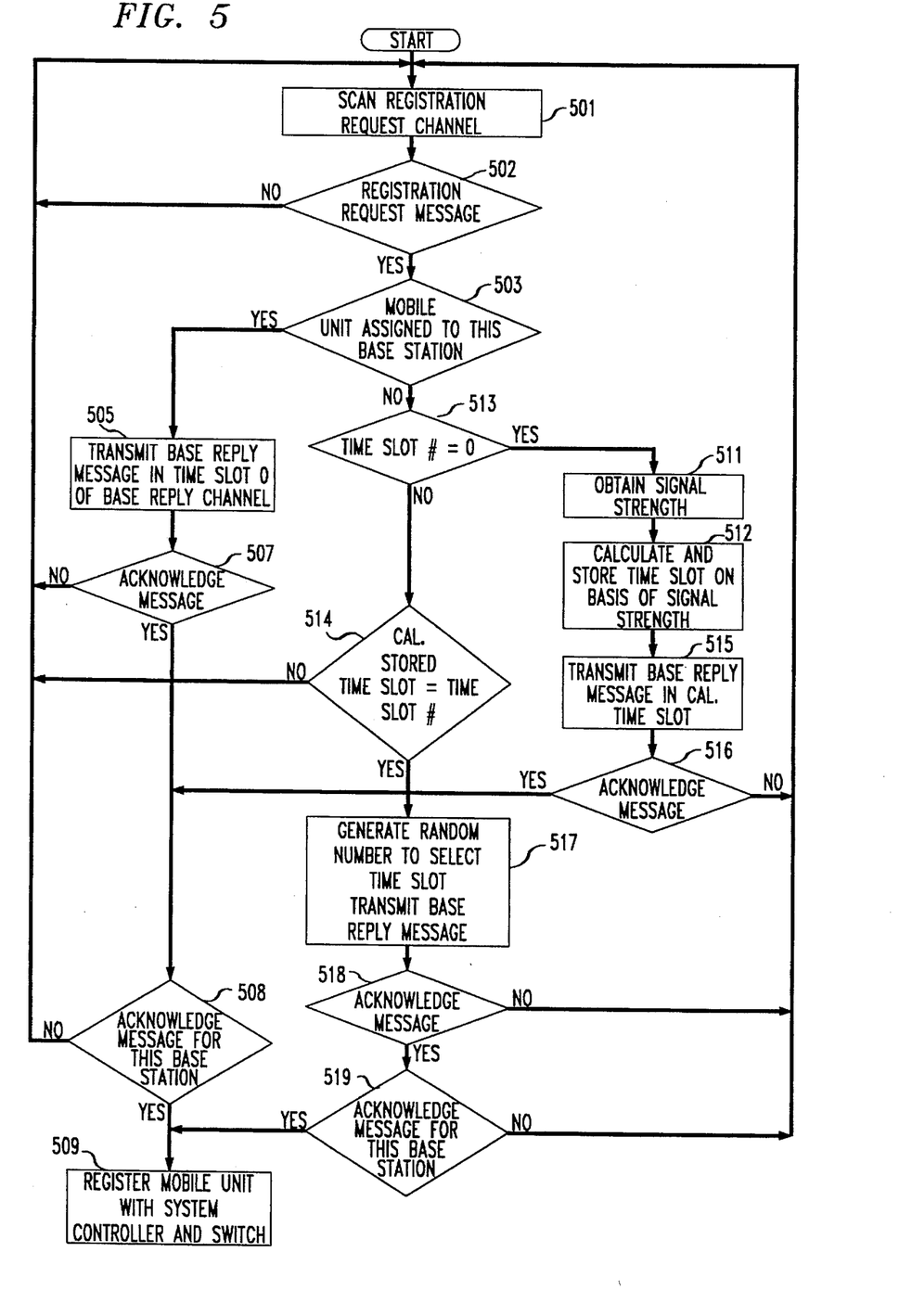
FIG. 5 is a flow chart of the operations performed by the base controller of a base station during the registration procedure in accordance with the invention.

FIG. 5 illustrates, in flow chart form, the operations controlled by a base controller of a base station in response to a registration request message. The base controller utilizes an idle radio unit to scan the registration request channel as indicated in block 501. If a registration request message is detected by decision block 502, control is transferred to decision block 503. The latter block determines whether or not the mobile unit is assigned to this base station. If the mobile unit is assigned to this base station, control is transferred to block 505 which transmits a base reply message in time slot 0 of the base reply channel. Decision block 507 then waits for a predefined amount of time for the acknowledge message from the mobile unit. If this acknowledge message is not received, control is transferred to decision block 501 since it is assumed that the acknowledge message was not received because of collisions between two mobile units or other interference. If an acknowledge message is received, decision block 508 determines whether or not it is for this base station. If it is for this base station, then the base station registers the mobile unit with system controller and switch 101 in block 509.

Returning to decision block 503, if the mobile unit is not assigned to this base station, control is transferred to decision block 513 which examines the time slot number in the registration request message. If this time slot number is 0 indicating that this is the first registration request message transmitted by the mobile unit, control is transferred to block 511 which obtains the signal strength of the mobile unit from the signal strength monitor of the radio unit in use; and then, block 512 calculates the time slot to be used to transmit the base reply message based on the signal strength. Block 512 also stores the number of the time slot for later use if a collision occurs during transmission of the base reply message. After block 512, control is transferred to block 515 which transmits the base reply message in the calculated time slot. Next, control is transferred to decision block 516 which awaits an acknowledge message. If an acknowledge message is received, decision block 516 transfers control to decision block 508 whose operation was described in the previous paragraph. If no acknowledge message is received in block 516, control is transferred back to block 501, since it is assumed that a collision has occurred with another mobile unit or a base station responding to yet another mobile unit.

Returning to decision block 513, if the time slot number does not equal 0, control is transferred to decision block 514 since this indicates that this is the second registration message sent by this mobile unit as a result of a collision in a time slot selected by two or more base stations. Decision block 514 determines whether the previously calculated time slot is equal to the time slot number in the registration request message. If the answer is yes, then block 517 is executed to generate a random number which is utilized to select the time slot number for transmission of the base reply message. After execution of block 517 and transmission of the base reply message, decision block 518 is executed to determine if an acknowledge message has been received from the mobile unit. If an acknowledge message has been received, decision block 519 determines whether this acknowledge message was for this base station. If the acknowledge message was for this base station, block 509 is executed to register the mobile unit with system controller and switch 101. If the determination of either decision block 518 or 519 was no, block 501 is executed.

Figure 9:
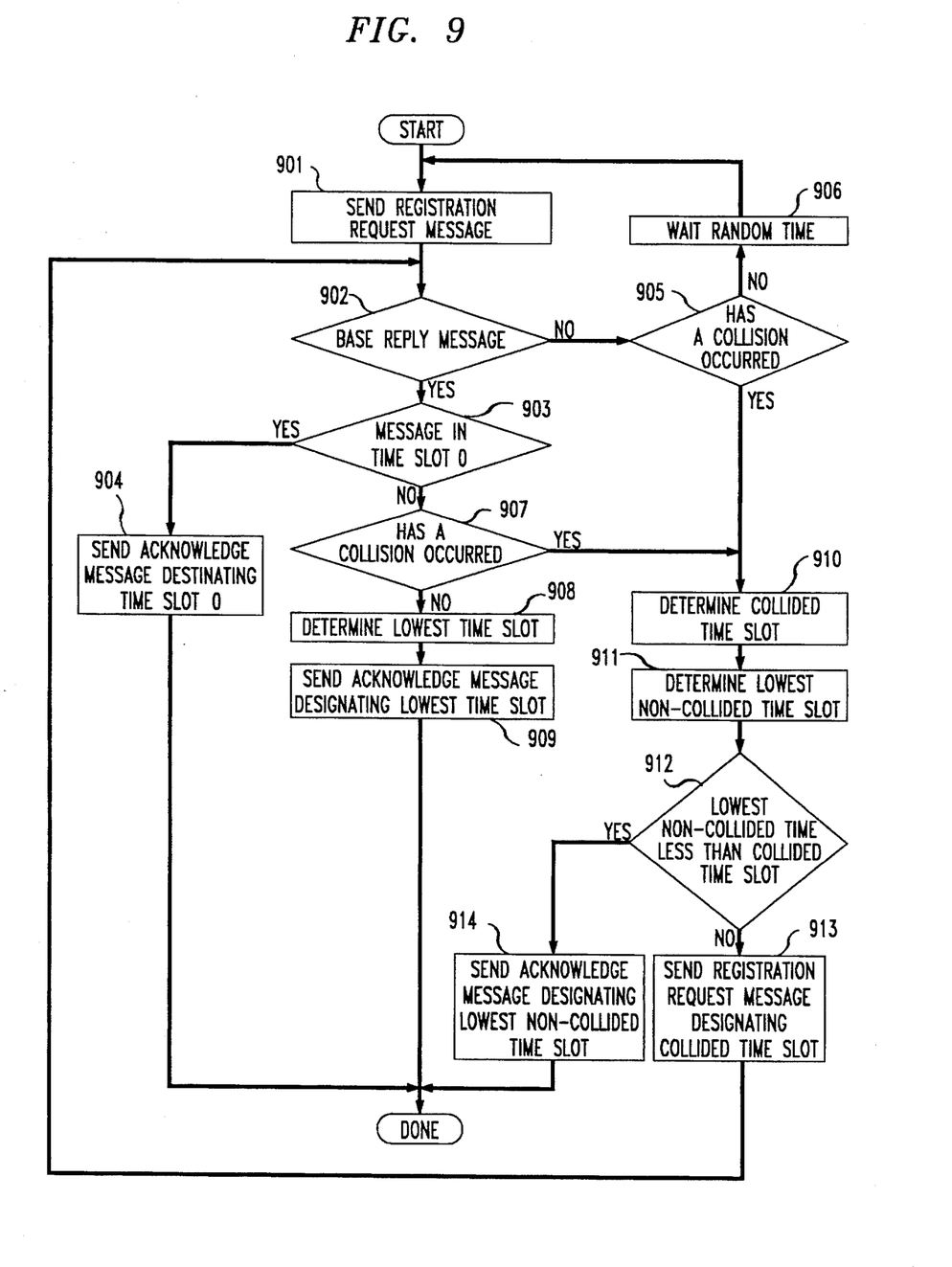
FIG. 9 is a flow chart of the operations performed by a mobile unit during the registration procedure in accordance with the invention.

FIG. 9 illustrates, in flow chart form, the operations performed by a control unit in a mobile unit during the registration process. As previously described, the mobile unit first transmits the registration request message in block 901. The mobile unit then awaits for a predefined amount of time for the base reply message in decision block 902. If the base reply message is not received within this predefined amount of time, decision block 905 is executed to determine if a collision occurred in a time slot since the collision may have resulted causing decision block 902 not to detect the base reply message. If a collision has occurred, block 910 is executed whose operations are detailed in a later paragraph. If a collision has not occurred, control is transferred to block 906. Block 906 is executed which causes the mobile unit to wait for a random amount of time and then resends the registration request message by re-execution of block 901.

If a base reply message is received by decision block 902, decision block 903 is executed to determine whether or not the base reply message was in time slot 0 of the base reply channel. If the message was in time slot 0, block 904 is executed to send an acknowledge message designating time slot 0.

Returning to decision block 903, if the result was no, then decision block 907 is executed to determine whether or not a collision had occurred in any of the time slots of the base reply frame. If no collisions were detected, control is transferred to block 908 which determines the earliest time slot and transmits an acknowledge message by execution of block 909.

Returning to decision block 907, if a collision was detected in the base reply frame, block 910 is executed to determine the collided time slot, and block 911 is executed to determine the earliest non-collided time slot. Decision block 912 determines whether the earliest non-collided time slot has a lower number than the collided time slot. If the answer is yes, then control is transferred to 914 which transmits the acknowledge message designating the earliest non-collided time slot since it is not necessary to be concerned about the time slot in which the collision had occurred. However, if the result of the determination in decision block 912 is no, then a registration request message is sent designating the collided time slot and control is returned to decision block 902. In response to the registration request message generated by 913, the base stations, which had transmitted in the collided time slot, each generate a random time slot and transmit a base reply message which is detected by decision block 902 and processed in the manner described for blocks 907–914.

Consider now how a call received from central office 115 by system and controller switch 101 is connected to mobile unit 105. Assume that at this point in time mobile unit 105 has registered its ID to system controller and switch 101 via base station 103 as was described in the previous example. As is described in the application of M. E. Gillis, a mobile unit when not in active use powers itself down for 100 milliseconds. (Note in the application by Gillis this period is 400 milliseconds; however, in the present application, this period is 100 milliseconds.) Every 100 milliseconds, the mobile unit powers itself up and checks whether its ID code is being transmitted on the dedicated incoming dotting channel. Under control of system and controller switch 101, base station 103 transmits on the incoming dotting channel a frame having the same configuration as the registration request frame of FIG. 6 for 100 milliseconds. Mobile unit 105 synchronizes using the dotting interval and detects its own ID or security code. Mobile unit 105 utilizes the dotting pattern, and the barker code to achieve what is called "Big Sync". Big Sync means that the mobile unit is in frame synchronization with the base station. Mobile unit 105 then transmits back the dotting pattern, the security code and the barker code to base station 103, via the incoming Big Sync channel. Base station 103 switches to the Big Sync channel and assures that its clock is in phase alignment with the clock of mobile unit 105. Both base station 103 and mobile unit 105 are now transmitting and receiving on the incoming Big Sync channel. Now, base station 103 transmits to mobile unit 105 an opcode informing the mobile unit to stop sending the dotting frame. Then, base station 103 transmits to mobile unit 105 the pseudo-random seed which is utilized by TDD 303 and control unit 301 of FIG. 3 to generate the frequency data for the hopping sequence. The same pseudo-random seed, which is transferred from base controller 201, is utilized by TDD 211 of FIG. 2 which is part of radio unit 202 to generate the same hopping sequence. However, it is necessary for radio unit 202 and mobile unit 105 to synchronize the start of the hopping sequence. Thus, once base station 103 has transmitted the pseudo-random seed, it starts the procedure for synchronizing the hopping sequence. Synchronization between base station 103 and mobile unit 105 is achieved by having base station 103 select a specific number after which it and mobile unit 105 must begin hopping. This number is also provided to mobile unit 105 in a series of messages arranged in a count-down like sequence in groups of frames transmitted over the incoming Big Sync channel. For every message in the count-down sequence, mobile unit 105 responds with an acknowledge message to base station 103. When the specific number is reached in this series of start hopping messages, both base station 103 and mobile unit 105 start the hopping sequence and voice transmission can take place between base station 103 and mobile unit 105. Note, normally the start hopping number is zero.

Consider how mobile unit 105 initiates a call. A call is initiated in mobile unit 105 by the actuation of a key in telephone circuits and keypad 305. In response to key actuation, mobile unit 105 powers itself up and transmits a frame which is similar to the frame illustrated in FIG. 6 in which the security code is the identification of mobile unit 105. All base stations having an idle radio unit monitor the outgoing call request channel. Mobile unit 105 transmits the dotting frame over several frames. The idle radio units in the base stations respond to the dotting frame on the outgoing call request by recording an average power measurement over the received frames. Each base station reports this average power to system controller and switch 101 which determines which base station should handle the outgoing call. After this decision is made, the setting up of the call proceeds as for an incoming call except that the outgoing dotting and outgoing Big Sync channels are substituted for the incoming dotting and incoming Big Sync channels.

We claim:

1. A wireless base station for operation in a wireless system, the wireless base station being interconnected to a switching system for establishment of communication links and the wireless system including a plurality of wireless mobile units for establishing communication with the wireless base station, the wireless base station comprises:

means for receiving a first service request message from one of the wireless mobile units;

means for transmitting a first base reply message to the one of the wireless mobile units in a predefined time slot of a frame of time slots upon the one of the wireless mobile units being assigned to the wireless base station;

means for determining a time slot on the basis of the received signal strength of the one of wireless mobile units;

the transmitting means further transmitting the first base reply message to the one of wireless mobile units in the determined time slot upon the one of the wireless mobile units not being assigned to the wireless base station;

receiving means further receiving a second service request message from the one of the wireless mobile units indicating a collision during the transmission of the first base reply message;

the determining means further responsive to the indication of a collision for randomly determining a time slot; and the transmitting means further transmitting a second base reply message in the randomly determined time slot.

2. The wireless base station of claim 1 wherein the collision indication specifies the time slot in which the collision occurred and the determining means only determines the randomly determined time slot upon the specified time slot being identical to the time slot in which the first base reply message was transmitted.

3. A wireless base station for operation in a wireless system, the wireless base station being interconnected to a switching system for establishment of communication links and the wireless system including a plurality of wireless mobile units for establishing communication with the wireless base station, the wireless base station comprises:

means for receiving a first service request message from one of the wireless mobile units;

means for transmitting a first base reply message in one time slot of a frame of time slots;

the receiving means further receiving a second service request message from the one of the wireless mobile units indicating a collision during the transmission of the first base reply message;

the determining means further responsive to the indication of a collision for randomly determining a time slot; and the transmitting means further transmitting a second base reply message in the randomly determined time slot.

4. The wireless base station of claim 3 wherein the collision indication specifies a time slot in which the collision occurred and the determining means only determines the randomly determined time slot upon the specified time slot being identical to the time slot in which the first base reply message was transmitted.

5. The wireless base station of claim 4 wherein the transmitting means comprises means for determining a predefined time slot for the first base reply message upon the one of the wireless mobile unit being assigned to the wireless mobile unit.

6. The wireless base station of claim 5 wherein the determining means further determining a time slot for the first base reply message on the basis of the received signal strength of the one of wireless mobile units; and the transmitting means further transmitting the first base reply message in the determined time slot upon the one of the wireless mobile units not being assigned to the wireless base station.

7. A wireless telephone system for the communication of telephone calls having a plurality of wireless base stations and a switching system and a plurality of wireless mobile units for establishing communication with the wireless base stations, each of the wireless base stations comprises:

means for receiving a first service request message from one of the wireless mobile units:

means for transmitting a first base reply message in one time slot of a frame of time slots;

the receiving means further receiving a second service request message from the one of the wireless mobile units indicating a collision during the transmission of the first base reply message;

the determining means further responsive to the indication of a collision for randomly determining a time slot; and the transmitting means further transmitting a second base reply message in the randomly determined time slot.

8. The wireless telephone system of claim 7 wherein the collision indication specifies the time slot in which the collision occurred and the determining means only determines the randomly determined time slot upon the specified time slot being identical to the one time slot in which the first base reply message was transmitted.

9. The wireless telephone system of claim 8 wherein the transmitting means comprises means for determining a predefined time slot for the first base reply message upon the one of the wireless mobile unit being assigned to the wireless mobile unit.

10. The wireless telephone system of claim 9 wherein the determining means further determining a time slot for the first base reply message on the basis of the received signal strength of the one of wireless mobile units; and the transmitting means further transmitting the first base reply message in the determined tine slot upon the one of the wireless mobile units not being assigned to the wireless base station.

11. A wireless mobile unit for operation in a wireless system with the wireless mobile unit being connectable to a plurality of wireless base stations by wireless links, the wireless mobile unit comprises:

means for transmitting a service request message;

means responsive to a plurality of base reply messages transmitted in a plurality of time slots by the wireless base stations in responsive to the service request message for determining that a set of the base reply messages were transmitted in one of the time slots; and transmitting means further responsive to the determined set of the base reply messages for transmitting another service request message identifying the one of the time slots.

12. The wireless mobile unit of claim 11 wherein the transmitting means comprises means for assigning priority numbers to the time slots; and means for inserting the priority number of the one of the time slots into the acknowledgement message to identify the one of the time slots.

13. The wireless mobile unit of claim 11 wherein the transmitting means comprises means responsive to no set of the base reply messages being determined for selecting one of the wireless base stations; and the transmitting memos further responsive to the selection for transmitting an acknowledgement message to the selected one of the wireless base stations.

14. The wireless mobile unit of claim 13 wherein the selecting means comprises means for assigning priority numbers to the time slots; and means for determining the highest priority time slot in which a base reply message was received.

15. The wireless mobile unit of claim 14 wherein the acknowledgement message includes the priority number of the highest priority time slot for identifying the selected one of the wireless base stations.

16. The wireless mobile unit of claim 15 wherein the highest priority time slot is the first time slot received from the plurality of wireless base stations.

17. A method for controlling the operation of a wireless base station in a wireless system, the wireless base station being interconnected to a switching system for establishment of communication links and the wireless telephone system including a plurality of wireless mobile units for establishing communication with the wireless base station, the method comprises the steps of:

receiving a first service request message from one of the wireless mobile units;

transmitting a first base reply message to the one of the wireless mobile units in a predefined time slot of a frame of time slots upon the one of the wireless mobile units being assigned to the wireless base station;

determining a time slot on the basis of the received signal strength of the one of wireless mobile units;

the transmitting step further transmitting the first base reply message to the one of the wireless mobile units in the determined time slot upon the one of the wireless mobile units not being assigned to the wireless base station;

the receiving step further receiving a second service request message from the one of the wireless mobile units indicating a collision during the transmission of the first base reply message;

the determining step further responsive to the indication of a collision for randomly determining a time slot; and the transmitting Step further transmitting a second base reply message in the randomly determined time slot.

18. The method of claim 17 wherein the collision indication specifies the time slot in which the collision occurred and the determining step only determines the randomly determined time slot upon the specified time slot being identical to the time slot in which the first base reply message was transmitted.

19. A method for controlling the operation of a wireless base station in a wireless telephone system, the wireless base station being interconnected to a switching system for establishment of telephone calls and the wireless telephone system including a plurality of wireless mobile units for establishing communication with the wireless base station, the method comprises the steps of:

receiving a first service request message from one of the wireless mobile units;

transmitting a first base reply message in one time slot of a frame of time slots;

the receiving step further receiving a second service request message from the one of the wireless mobile units indicating a collision during the transmission of the first base reply message;

the determining step further responsive to the indication of a collision for randomly determining a time slot; and the transmitting step further transmitting a second base reply message in the randomly determined time slot.

20. The method of claim 19 wherein the collision indication specifies the time slot in which the collision occurred and the determining step only determines the randomly determined time slot upon the specified time slot being identical to the one time slot in which the first base reply message was transmitted.

21. The method of claim 20 wherein the transmitting step comprises the step of determining a predefined time slot for the first base reply message upon the one of the wireless mobile unit being assigned to the wireless mobile unit.

22. The method of claim 21 wherein the determining step further determining a time slot for the first base reply message on the basis of the received signal strength of the one of wireless mobile units; and the transmitting step further transmitting the first base reply message in the determined time slot upon the one of the wireless mobile units not being assigned to the wireless base suction.

23. A method for controlling the operation of a wireless mobile unit in a wireless system with the wireless mobile unit being connectable to a plurality of wireless base stations by wireless links, the method comprises the steps of:

transmitting a service request message;

determining that a set of the base reply messages were transmitted in one of the time slots in response to a plurality of base reply messages transmitted in a plurality of time slots by the wireless base stations in responsive to the service request message; and the transmitting step responsive to the determined set of the base reply messages for transmitting another service request message identifying the one of the time slots.

24. The method of claim 23 wherein the transmitting step comprises the steps of assigning priority numbers to the time slots; and inserting the priority number of the one of the time slots into the acknowledgement message to identify the one of the time slots.

25. The method of claim 23 wherein the transmitting step comprises the step of selecting one of the wireless base stations in response to no set of the base reply messages being determined; and the transmitting step further responsive to the selection for transmitting an acknowledgement message to the selected one of the wireless base stations.

26. The method of claim 25 wherein the selecting step comprises the steps of assigning priority numbers to the time slots; and determining the highest priority time slot in which a base reply message was received.

27. The method of claim 26 wherein the acknowledgement message includes the priority number of the highest priority time slot for identifying the selected one of the wireless base stations.

28. The method of claim 27 wherein the highest priority time slot is the first time slot received from the plurality of wireless base stations.

* * * * *